(No Model.) 3 Sheets—Sheet 1.

C. T. BARRETT.
STORAGE BATTERY.

No. 578,710. Patented Mar. 16, 1897.

Witnesses:
D. W. Gardner
M. J. O'Connor

Inventor:
Cornelius Thomas Barrett
By his Attorney
George William Miatt (No Model.) 3 Sheets—Sheet 2.
C. T. BARRETT.
STORAGE BATTERY.
No. 578,710. Patented Mar. 16, 1897.
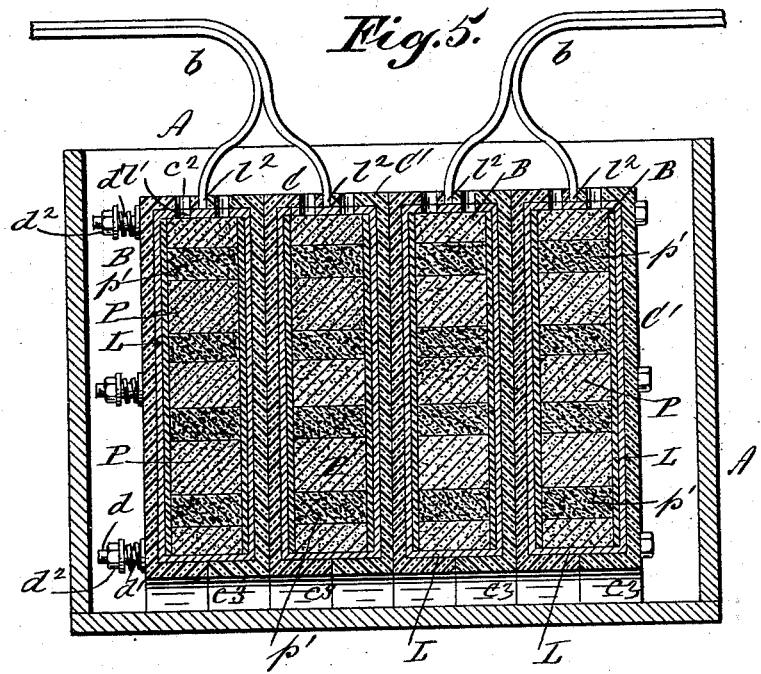
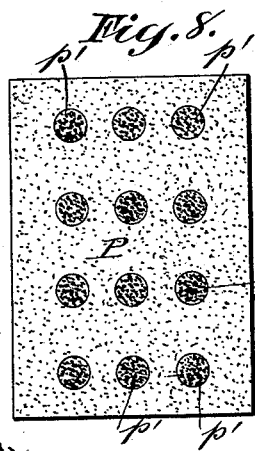
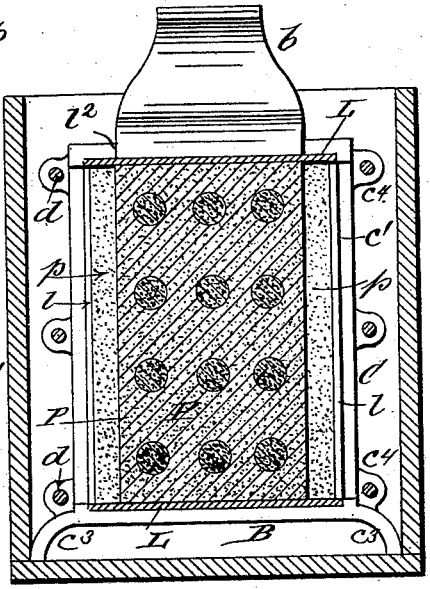
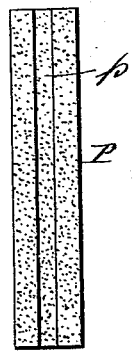
Witnesses:
D. W. Gardner
M. J. O'Connor
Inventor:
Cornelius Thomas Barrett
By his attorney
George William Miatt

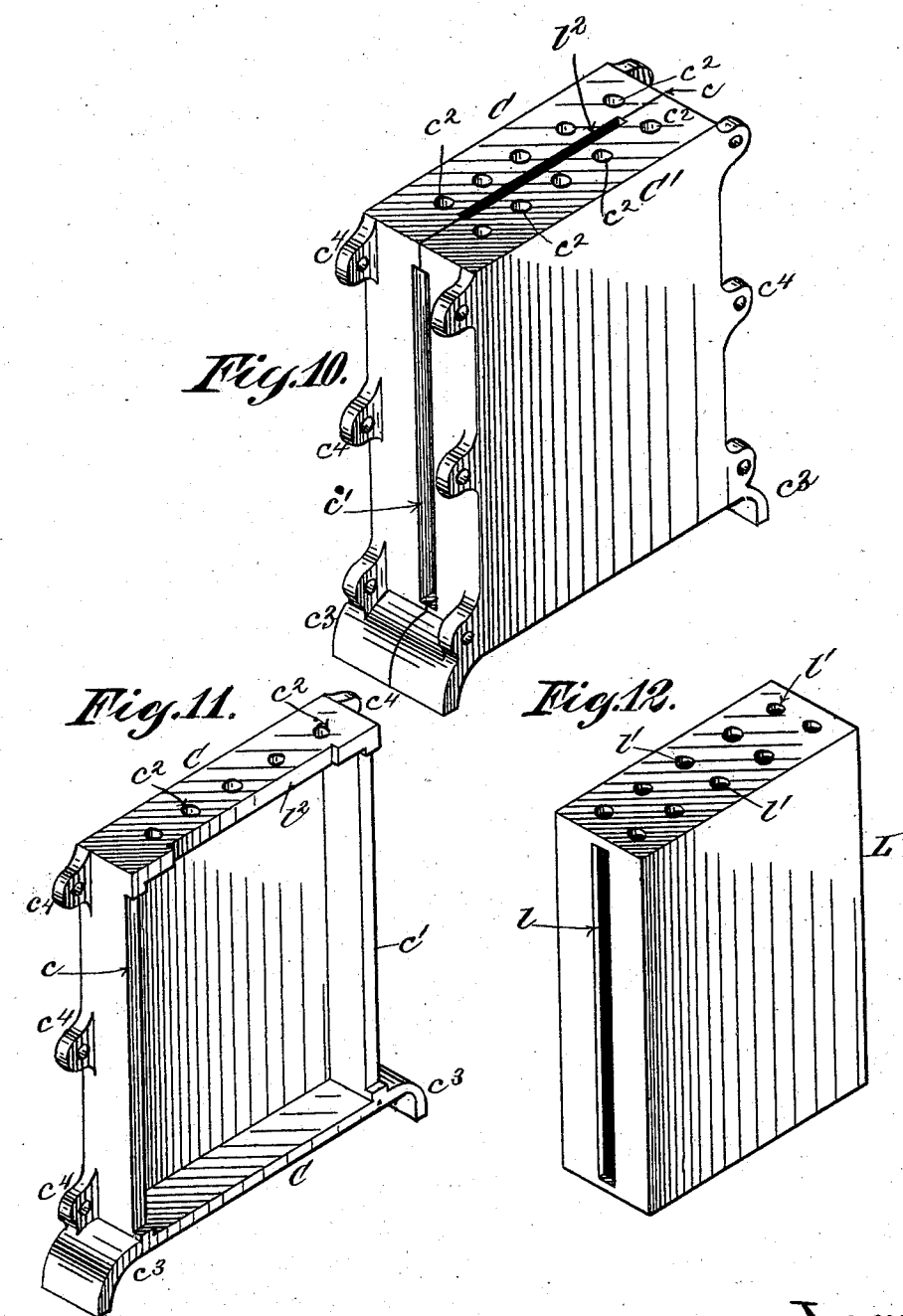

UNITED STATES PATENT OFFICE.

CORNELIUS THOMAS BARRETT, OF BROOKLYN, NEW YORK.

STORAGE-BATTERY.

SPECIFICATION forming part of Letters Patent No. 578,710, dated March 16, 1897.

Application filed May 4, 1896. Serial No. 590,143. (No model.)

*To all whom it may concern:*

Be it known that I, CORNELIUS THOMAS BARRETT, a citizen of the United States, residing in the city of Brooklyn, in the county of Kings and State of New York, have invented certain new and useful Improvements in Storage Batteries, of which the following is a specification sufficient to enable others skilled in the art to which the invention appertains to make and use the same.

The object of my invention is to attain a storage battery of longer life and greater efficiency and at the same time of lighter construction for a given power or capacity as compared with batteries heretofore known and used; also, one in which the objectionable features of buckling, short-circuiting, and disintegration or dropping out of peroxid will be counteracted or avoided.

A distinguishing feature of my invention consists in the use of a cell having a porous plate of pumice-stone in and upon which the peroxid is applied, the said porous plate and peroxid being inclosed in a leaden box which secures the parts in intimate contact, while providing for the admission and circulation of the acidulated solution. By this means the plugs of peroxid are positively held in place and the evil effects of alternating expansion and contraction met and counteracted. Owing also to the intimate contact attained between the surfaces and peroxid or equivalent material what is known as "sulfating" or "disintegration" is practically avoided, the full efficiency of the cell being thereby maintained. A feature of my invention in this connection consists in interposing a layer of coke-dust between the peroxid or equivalent material and the interior surface of the leaden case, thereby increasing the efficiency of both the leaden surfaces and the peroxid, owing to the conductivity of the coke-dust and the intimate contact or connection which it establishes between both.

My invention also includes certain other special features of construction and arrangement used in conjunction with my cell having the porous plate of pumice-stone, the use of the latter material being an essential and important feature in my battery, affording, as it does, the required degree of porosity with great strength and durability.

Figure 1:
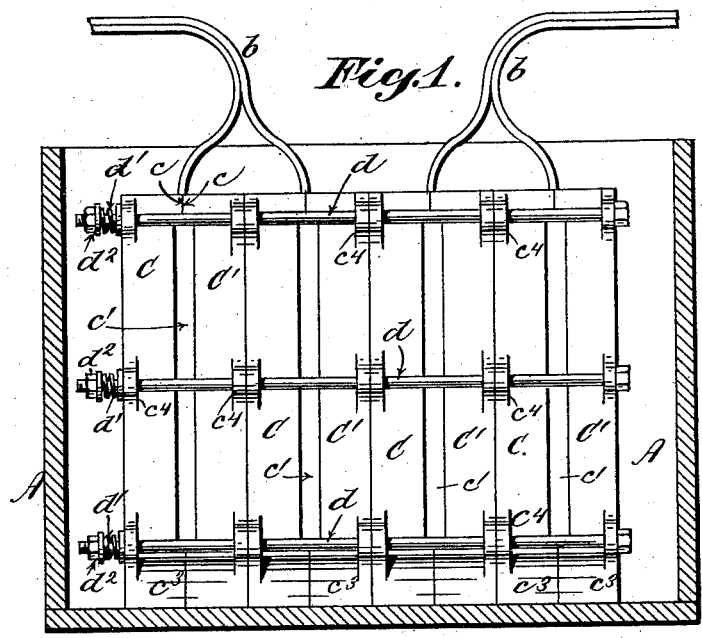
Figure 3:
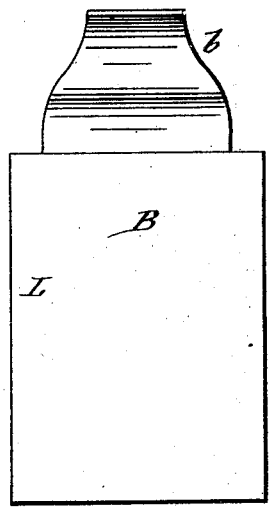
Figure 2:
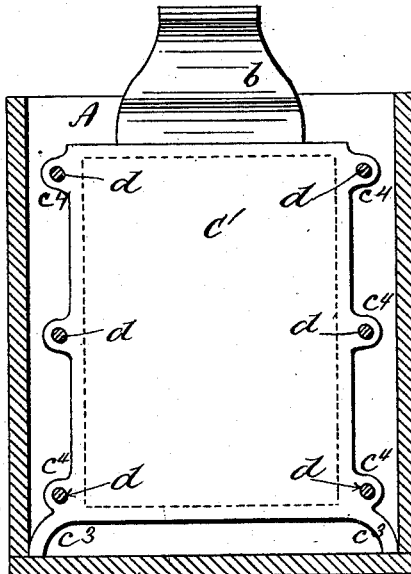
Figure 4:
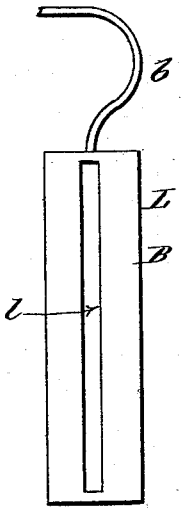

In the accompanying drawings, Figure 1 is a section of a tank, showing a series of four of my improved cells in elevation; Fig. 2, a sectional elevation taken upon plane of line 2 2, Fig. 1. Fig. 3 is a side elevation of one of the cells; Fig. 4, an edge view of the same. Fig. 5 is a vertical section upon plane of line 5 5, Fig. 2; Fig. 6, a transverse section upon plane of line 6 6, Fig. 1; Fig. 7, a view of one end of a porous plate; Fig. 8, a side view of the same; Fig. 9, an edge view of same; Fig. 10, an isometrical perspective of a cell-case; Fig. 11, an isometrical perspective of one-half of same; Fig. 12, an isometrical perspective of a cell.

A is a tank of any desired size suitable for the accommodation of a specified number of cells. Each cell B is inclosed in a casing C C', of insulating material, such as rubber, vulcanite, or equivalent substance. Each casing is made in two parts or halves C C', fitting over opposite sides of a cell B, the opposed edges $c$ $c$ being offset to form slots $c'$ $c'$ when the halves C C' are joined, through which slots $c'$ $c'$ the acidulated solution has access to the cell B as well as through the perforations $c^2$ $c^2$ in the top of the casing.

The casings are preferably formed with feet $c^3$ $c^3$ to elevate them slightly from the floor of the tank A and with lugs $c^4$ $c^4$, through which pass the bolts $d$ $d$, by which the casings and their contents are bound together. Springs $d'$ $d'$, interposed between the tightening-nuts $d^2$ $d^2$ and the adjoining casing, afford an elastic tension or yielding pressure which compensates for the expansion and contraction of the parts inevitably arising from the alternate charging and discharging of the battery.

The cells B are coupled together by the connections $b$ $b$ into series of two or more cells adjoining each other, the connections at the opposite ends of the battery forming, respectively, the positive and negative poles. Each cell consists of a box or envelop of lead L, formed with the slots $l$ upon its vertical edges coinciding with the slots $c'$ $c'$ formed between the casings C C', and with perforations $l'$ $l'$ at top coinciding with the perforations $c^2$ $c^2$ in the said casings C C'. The leaden box L is made to fit snugly within and between the halves C C' of the casings, the acidulated liquid circulating only through the slots $c'$ $c'$ $l$ $l$ and perforations $c^2$ $c^2$ and $l'$ $l'$.

Within each leaden-box cell is a porous plate P, of pumice-stone, which material I have found by investigation and experiment to be the most suitable for my purpose on account of its high degree of porosity combined with its superior strength and durability. The porous slab or plate P has grooves $p$ $p$ formed in its longitudinal edges, which grooves, when the plate is in position within the lead box L, coincide with the slots $l$ $l$ in said box and the slots $c'$ $c'$ between the edges of the casings C C'. The plate P is also formed with the perforations or plug-holes $p'$, extending transversely through its body, these holes being filled with peroxid or equivalent material, and the broad sides of the plate being then covered each with a layer of such material, over which is then placed a layer of coke-dust, so that when the lead box L is applied its inner broad surfaces will rest against the layers of coke-dust.

The lead box L is made in two pieces or otherwise formed, so that the porous plate with its covering material may be inserted, the box being then closed, and the joint or joints soldered or otherwise secured. The conductors $b$ $b$ are also soldered or otherwise securely joined to the top of the lead box L and project up through the slot $l^2$ between the upper edges of the casings C C' when the latter are applied.

What I claim as my invention, and desire to secure by Letters Patent, is—

1. In a storage battery a cell consisting of a plate of pumice-stone to which the peroxid or equivalent material is applied in combination with a confining envelop of lead having openings for the admission of the acidulated fluid, substantially in the manner and for the purpose described.

2. In a storage battery a cell consisting of a perforated plate of pumice-stone in and upon which the peroxid or equivalent material is deposited in combination with a confining envelop of lead having openings for the admission of the acidulated fluid, substantially in the manner and for the purpose described.

3. In a storage battery a cell consisting of a plate of porous material to which the peroxid or equivalent material is applied, said plate being formed with grooves in its edges for the admission of the acidulated fluid, in combination with a confining envelop of lead having openings for admitting said acidulated fluid to the said grooves in the said porous plate substantially in the manner and for the purpose described.

4. In a storage battery a cell consisting of a perforated plate of porous material in and upon which the peroxid or equivalent material is deposited, said porous plate being formed with grooves in its longitudinal edges, in combination with a confining envelop of lead formed with openings coinciding with the said grooves in said porous plate for the admission of the acidulated liquid to the porous plate, substantially in the manner described.

5. In a storage battery, a cell consisting of a perforated plate of porous material in and upon which the peroxid or equivalent material is deposited, said porous plate being formed with grooves in its longitudinal edges, in combination with a confining envelop of lead formed with openings coinciding with the said grooves in said plate and with perforations in its top for the admission of the acidulated liquid to the porous plate, substantially in the manner and for the purpose described.

6. In a storage battery, a cell consisting of a porous plate to which the peroxid or equivalent material is applied, a layer of coke-dust covering in whole or in part the peroxid or equivalent material, and a confining envelop of lead having an opening for the admission of the acidulated liquid to the said porous plate, substantially in the manner and for the purpose described.

7. In a storage battery, the combination of a cell consisting of a porous plate to which the peroxid or equivalent material is applied, a confining envelop of lead having openings for the admission of the acidulated liquid to the said porous plate, and a cell-holder of insulating material formed with openings communicating with the openings in the leaden envelop, substantially in the manner and for the purpose described.

8. In a storage battery, the combination of a cell consisting of a porous plate of pumice-stone to which the peroxid or equivalent material is applied, a confining envelop of lead having openings for the admission of the acidulated liquid to the said porous plate, and a cell-holder of insulating material formed in halves fitting together with openings between them communicating with the openings in the leaden envelop, substantially in the manner and for the purpose described.

9. In a storage battery, the combination of a cell consisting of a porous plate of pumice-stone to which the peroxid or equivalent material is applied, a confining envelop of lead having openings for the admission of the acidulated liquid to the said porous plate, a cell-holder of insulating material formed in halves fitting together with openings between them communicating with the openings in the leaden envelop, and means for holding the halves of the holder together with an elastic pressure for the purpose and substantially in the manner described.

CORNELIUS THOMAS BARRETT.

Witnesses:
D. W. GARDNER,
GEO. WM. MIATT.